United States Patent
Tanaka et al.

(10) Patent No.: US 7,807,314 B2
(45) Date of Patent: Oct. 5, 2010

(54) MEMBRANE ELECTRODE ASSEMBLY FOR USE IN SOLID POLYMER ELECTROLYTE FUEL CELL

(75) Inventors: Shintaro Tanaka, Wako (JP); Yoichi Asano, Wako (JP); Ryoichiro Takahashi, Wako (JP); Takuma Yamawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 881 days.

(21) Appl. No.: 11/714,163

(22) Filed: Mar. 6, 2007

(65) Prior Publication Data

US 2007/0218348 A1 Sep. 20, 2007

(30) Foreign Application Priority Data

Mar. 20, 2006 (JP) .............................. 2006-076194

(51) Int. Cl.
*H01M 8/10* (2006.01)
*H01M 4/02* (2006.01)

(52) U.S. Cl. ..................... 429/483; 429/481; 429/534

(58) Field of Classification Search ................... 429/38, 429/32, 44, 41
See application file for complete search history.

(56) References Cited

U.S. PATENT DOCUMENTS

2005/0233203 A1   10/2005   Hampden-Smith et al.

FOREIGN PATENT DOCUMENTS

| DE | 196 47 534 A1 | 5/1998 |
|---|---|---|
| DE | 198 40 517 A1 | 3/2000 |
| JP | 9-245801 A | 9/1997 |
| JP | 11-144740 A | 5/1999 |
| JP | 2001-189155 A | 7/2001 |
| JP | 2001-283875 A | 10/2001 |
| JP | 2003-115302 A | 4/2003 |
| JP | 2004-193106 A | 7/2004 |
| JP | 2004-296176 A | 10/2004 |
| JP | 2005-190701 A | 7/2005 |
| JP | 2005-294115 A | 10/2005 |

*Primary Examiner*—Patrick Ryan
*Assistant Examiner*—Thomas H. Parsons
(74) *Attorney, Agent, or Firm*—Arent Fox LLP

(57) ABSTRACT

A membrane electrode assembly that includes a cathode electrode catalyst layer and an anode electrode catalyst layer respectively disposed on one side and the other side of a solid polymer electrolyte membrane, gas diffusion layers disposed respectively on the sides of the electrode catalyst layers; and intermediate layers having pores and disposed respectively between the electrode catalyst layer and the gas diffusion layer and between the electrode catalyst layer and the gas diffusion layer. The volume per unit area and per unit mass of the pores having pore size of 0.1 to 10 μm in the intermediate layer in the cathode side is larger than that in the intermediate layer in the anode side. The pore volume of the intermediate layer in the cathode side is 1.7 to 4.3 μl/cm$^2$/mg and that of the intermediate layer in the anode side is 0.5 to 1.4 μl/cm$^2$/mg.

8 Claims, 4 Drawing Sheets

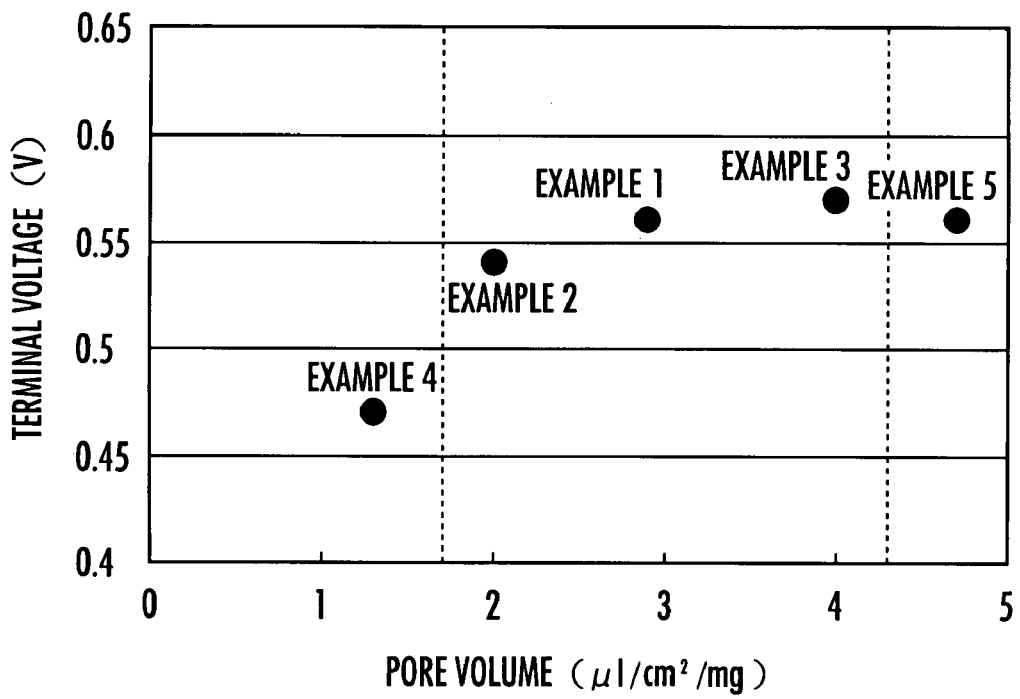
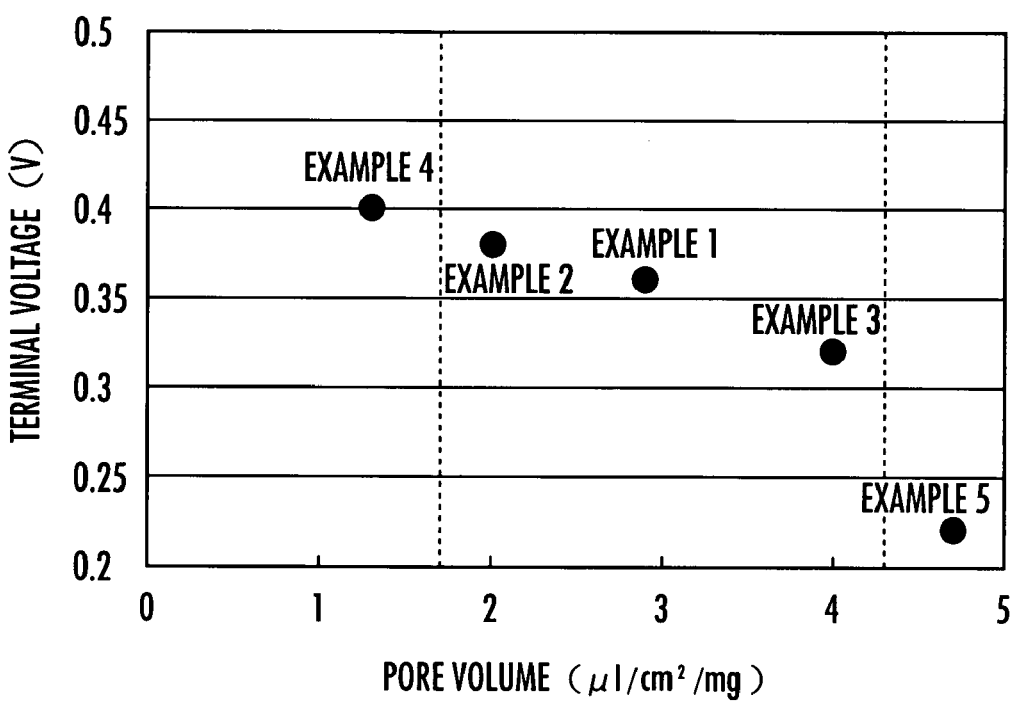

MEMBRANE ELECTRODE ASSEMBLY FOR USE IN SOLID POLYMER ELECTROLYTE FUEL CELL

BACKGROUND OF THE INVENTION

1. Field of the Invention

The present invention relates to a membrane electrode assembly for use in a solid polymer electrolyte fuel cell.

2. Description of the Related Art

Oil resources have been depleted, and at the same time, environmental problems including the global warming caused by fossil fuel consumption have been increasingly serious. Accordingly, fuel cells have attracted attention as clean electric power supplies for electric motors not involving the generation of carbon dioxide, and thus have been extensively developed and partially begin to be used practically. When the fuel cells are mounted in automobiles and the like, solid polymer electrolyte fuel cells using solid polymer electrolyte membranes are preferably used because such fuel cells can easily provide high voltage and large electric current.

Known as a membrane electrode assembly to be used in the solid polymer electrolyte fuel cell is a membrane electrode assembly which comprises a pair of electrode catalyst layers disposed respectively on both sides of a solid polymer electrolyte membrane having proton conductivity, and gas diffusion layers laminated respectively on the electrode catalyst layers. Each of the pair of the electrode catalyst layers is formed by supporting a catalyst such as platinum on a catalyst carrier such as carbon black and by integrating the supported catalyst into a single piece with an ion conducting polymer binder; one of the electrode catalyst layers acts as a cathode electrode catalyst layer and the other as an anode electrode catalyst layer. The gas diffusion layers are formed of, for example, carbon paper. The membrane electrode assembly may comprise two intermediate layers, each formed of a water-repellent resin containing electrically conducting particles, disposed respectively between one of the electrode catalyst layers and the gas diffusion layer pairing therewith and between the other of the electrode catalyst layers and the gas diffusion layer paring therewith. The membrane electrode assembly constitutes the solid polymer electrolyte fuel cell in combination with separators each doubling as a gas path and respectively being laminated on the gas diffusion layers.

In the solid polymer electrolyte fuel cell, the anode electrode catalyst layer is used as a fuel electrode into which a reductive gas such as hydrogen or methanol is introduced through the intermediary of the gas diffusion layer, and the cathode electrode catalyst layer is used as an oxygen electrode into which an oxidative gas such as air or oxygen is introduced through the intermediary of the gas diffusion layer. In this configuration, protons and electrons are generated in the anode electrode catalyst layer from the reductive gas by the action of the catalyst contained in the electrode catalyst layer, and the protons migrate to the electrode catalyst layer of the oxygen electrode side through the solid polymer electrolyte membrane. The protons react with the oxidative gas and the electrons introduced into the oxygen electrode to generate water in the cathode electrode catalyst layer by the action of the catalyst contained in the electrode catalyst layer. Consequently, connection of the anode electrode catalyst layer and the cathode electrode catalyst layer with a conductive wire makes it possible to form a circuit to transport the electrons generated in the anode electrode catalyst layer to the cathode electrode catalyst layer and to take out electric current.

In the membrane electrode assembly, the protons migrate along with water in the solid polymer electrolyte membrane. Accordingly, the solid polymer electrolyte membrane needs to have appropriate moisture. Such moisture is supplied, for example, by the reductive gas or the oxidative gas. However, there is a problem in that no sufficient electric power generation performance can be attained when the humidity of the reductive gas or the oxidative gas is low.

On the other hand, as described above, in the membrane electrode assembly, the electric power generation is accompanied by the generation of water in the cathode electrode catalyst layer. Consequently, a long-time operation of the fuel cell makes excessive the moisture in the membrane electrode assembly to inhibit the diffusion of the reductive gas or the oxidative gas, and hence this case also suffers from a problem that no sufficient electric power generation performance can be attained.

Various proposals have been presented to overcome the above described problems, including, for example, a technique in which in a membrane electrode assembly for use in a solid polymer electrolyte fuel cell comprising a pair of electrode catalyst layers disposed on both sides of a solid polymer electrolyte membrane and gas diffusion layers laminated respectively on the electrode catalyst layers, the pores in the gas diffusion layers are regulated. In this technique, the porosity of the gas diffusion layers is specified to fall within a range from 45 to 75%, and the specific volume of the pores, in the gas diffusion layers, falling within a pore size range from 17 to 90 µm is specified to fall within a range from 0.45 to 1.25 cm$^2$/g (see Japanese Patent Laid-Open No. 11-144740).

Also known is a technique in which in a membrane electrode assembly, for use in a solid polymer electrolyte fuel cell, comprising a gas diffusion layer laminated on each of the electrode catalyst layers through the intermediary of an intermediate layer, wherein the pores in the electrode catalyst layers are specified. In this technique, the total volume of the pores in the electrode catalyst layers falling within a pore size range from 0.01 to 30 µm is specified to be 6.0 µl/cm$^2$ or more per 1 mg of the catalyst (see Japanese Patent Laid-Open No. 2004-193106).

Also known is a technique in which in a membrane electrode assembly, for use in a solid polymer electrolyte fuel cell, comprising a gas diffusion layer laminated on each of the electrode catalyst layers through the intermediary of an intermediate layer, wherein the pores in the gas diffusion layers are regulated. In this technique, the density of each of the gas diffusion layers is specified to fall within a range from 0.2 to 0.55 g/cm$^3$ and the peak pore size in the pore size distribution in each of the gas diffusion layers is specified to be 10 to 100 µm (see Japanese Patent Laid-Open No. 2004-296176).

Further known is a technique in which in a membrane electrode assembly, for use in a solid polymer electrolyte fuel cell, comprising a gas diffusion layer laminated on each of the electrode catalyst layers through the intermediary of an intermediate layer, wherein the pores in the intermediate layers are regulated. In this technique, each of the intermediate layers is constituted with at least two layers different in pore size from each other, wherein the pore size distribution in each of the intermediate layers is made to have a gradient in such way that the pore size of the layer, of the at least two layers, on the electrode catalyst side is made to be smaller than the pore size of the layer, of the at least two layers, on the gas diffusion layer side (see Japanese Patent Laid-Open No. 2001-189155).

However, any of the above described conventional techniques involves disadvantages such that the pore size made smaller leads to insufficient gas diffusivity and insufficient capability of discharging the generated water, and the pore size made larger leads to insufficient water retentivity.

SUMMARY OF THE INVENTION

An object of the present invention is to provide a membrane electrode assembly for use in a solid polymer electrolyte fuel cell which assembly can ensure the gas diffusivity, the capability of discharging the generated water and the moisture retentivity, and can attain an excellent electric power generation performance in the gas atmosphere under a wide variety of humidity conditions, through overcoming the above described problems.

For the purpose of achieving the above described object, the present invention provides a membrane electrode assembly for use in a solid polymer electrolyte fuel cell, the membrane electrode assembly comprising: a solid polymer electrolyte membrane having proton conductivity; a cathode electrode catalyst layer disposed on one side of the solid polymer electrolyte membrane; an anode electrode catalyst layer disposed on the other side of the solid polymer electrolyte membrane; and two gas diffusion layers disposed on a side of the cathode electrode catalyst layer and a side of the anode electrode catalyst layer, respectively, both these sides facing away from the solid polymer electrolyte membrane; wherein the membrane electrode assembly comprises two intermediate layers comprising pores and disposed respectively between one of the electrode catalyst layers and the gas diffusion layer pairing therewith and between the other of the electrode catalyst layers and the gas diffusion layer pairing therewith, and the volume per unit area and per unit mass of the pores falling within a pore size range from 0.1 to 10 μm in the intermediate layer in the cathode side is larger than the volume per unit area and per unit mass of the pores falling within a pore size range from 0.1 to 10 μm in the intermediate layer in the anode side.

In the membrane electrode assembly for use in a solid polymer electrolyte fuel cell, when hydrogen is supplied to the anode side and air is supplied to the cathode side, the oxygen concentration in the air as the cathode gas is 20% and is lower than the concentration of the anode gas, and hence the improvement of the cathode gas diffusivity leads to the improvement of the electric power generation performance.

Accordingly, the membrane electrode assembly for use in a solid polymer electrolyte fuel cell of the present invention comprises two intermediate layers comprising pores and disposed respectively between one of the electrode catalyst layers and the gas diffusion layer pairing therewith and between the other of the electrode catalyst layers and the gas diffusion layer pairing therewith, and the volume per unit area and per unit mass of the pores falling within a pore size range from 0.1 to 10 μm in the intermediate layer in the cathode side is made larger than the volume per unit area and per unit mass of the pores falling within a pore size range from 0.1 to 10 μm in the intermediate layer in the anode side. The pores in the intermediate layers can favorably carry out, through having the pore sizes falling within the range from 0.1 to 10 μm, the gas diffusion and the discharge of the generated water.

Consequently, the membrane electrode assembly for use in a solid polymer electrolyte fuel cell of the present invention can ensure sufficient gas diffusivity and sufficient capability of discharging the generated water in the cathode side, and can ensure sufficient moisture retentivity in the anode side. Consequently, the membrane electrode assembly for use in a solid polymer electrolyte fuel cell of the present invention can attain an excellent electric power generation performance in the gas atmosphere under a wide variety of humidity conditions.

In the present invention, it is preferable that the volume per unit area and per unit mass of the pores falling within the specified pore size range in the intermediate layer in the cathode side falls within a range from 1.7 to 4.3 $\mu l/cm^2/mg$, and the volume per unit area and per unit mass of the pores falling within the specified pore size range in the intermediate layer in the anode side falls within a range from 0.5 to 1.4 $\mu l/cm^2/mg$. On the basis of the conditions such that the volume of the pores per unit area and per unit mass in each of the intermediate layer in the cathode side and the intermediate layer in the anode side falls within the above described range, the moisture content in the solid polymer electrolyte membrane is ensured under low-humidity conditions such as high load operation conditions, and there can be ensured the diffusivity of the cathode gas tending to affect the electric power generation performance under the low-temperature and high-humidity conditions as can be encountered at the time of start-up. Consequently, the membrane electrode assembly for use in a solid polymer electrolyte fuel cell of the present invention can attain a satisfactory electric power generation performance both under the high-humidity conditions and under the low-humidity conditions of the reductive gas or the oxidative gas.

Examples of the usable intermediate layers may include, for example, the layers formed of a water-repellent resin comprising an electrically conducting particle.

BRIEF DESCRIPTION OF THE DRAWINGS

FIG. 3 shows graphs each presenting the relation between the volume of the pores and the terminal voltage in the membrane electrode assembly of the present invention.

DETAILED DESCRIPTION OF THE PREFERRED EMBODIMENT

Figure 1:
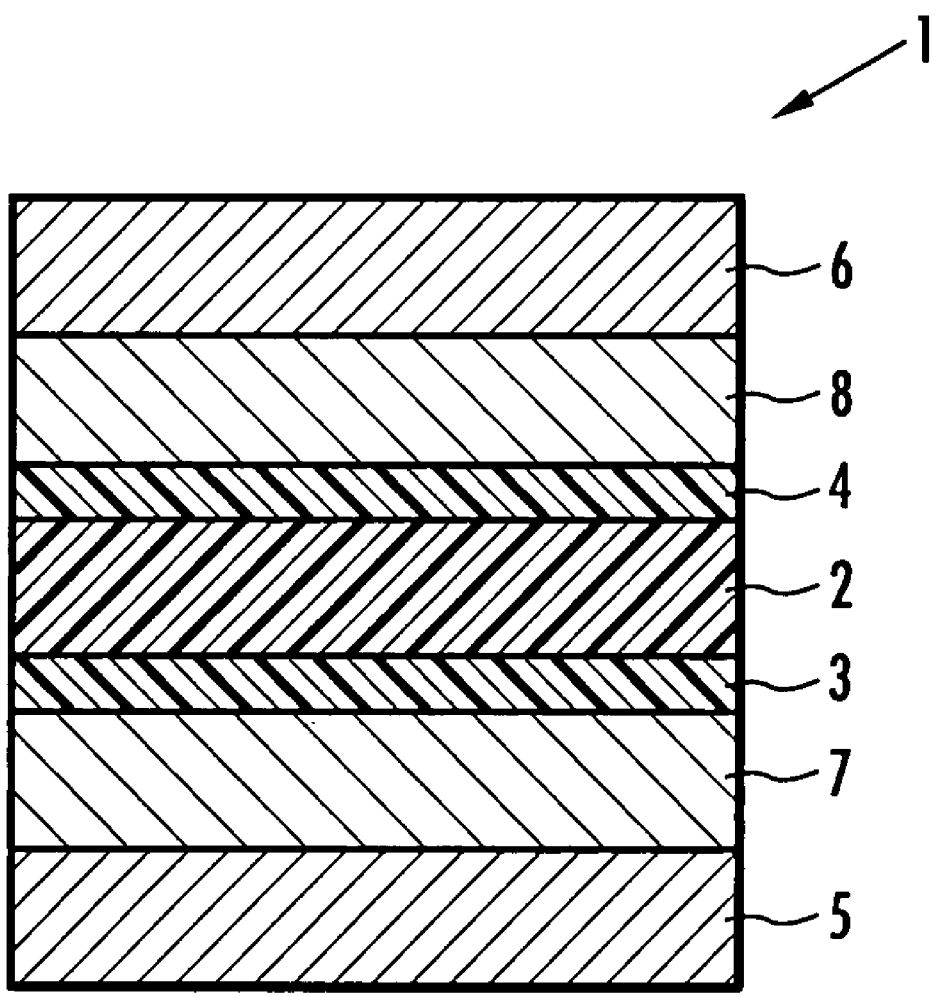
FIG. 1 is a schematic sectional view illustrating a configuration of a membrane electrode assembly of the present invention.
Figure 2:
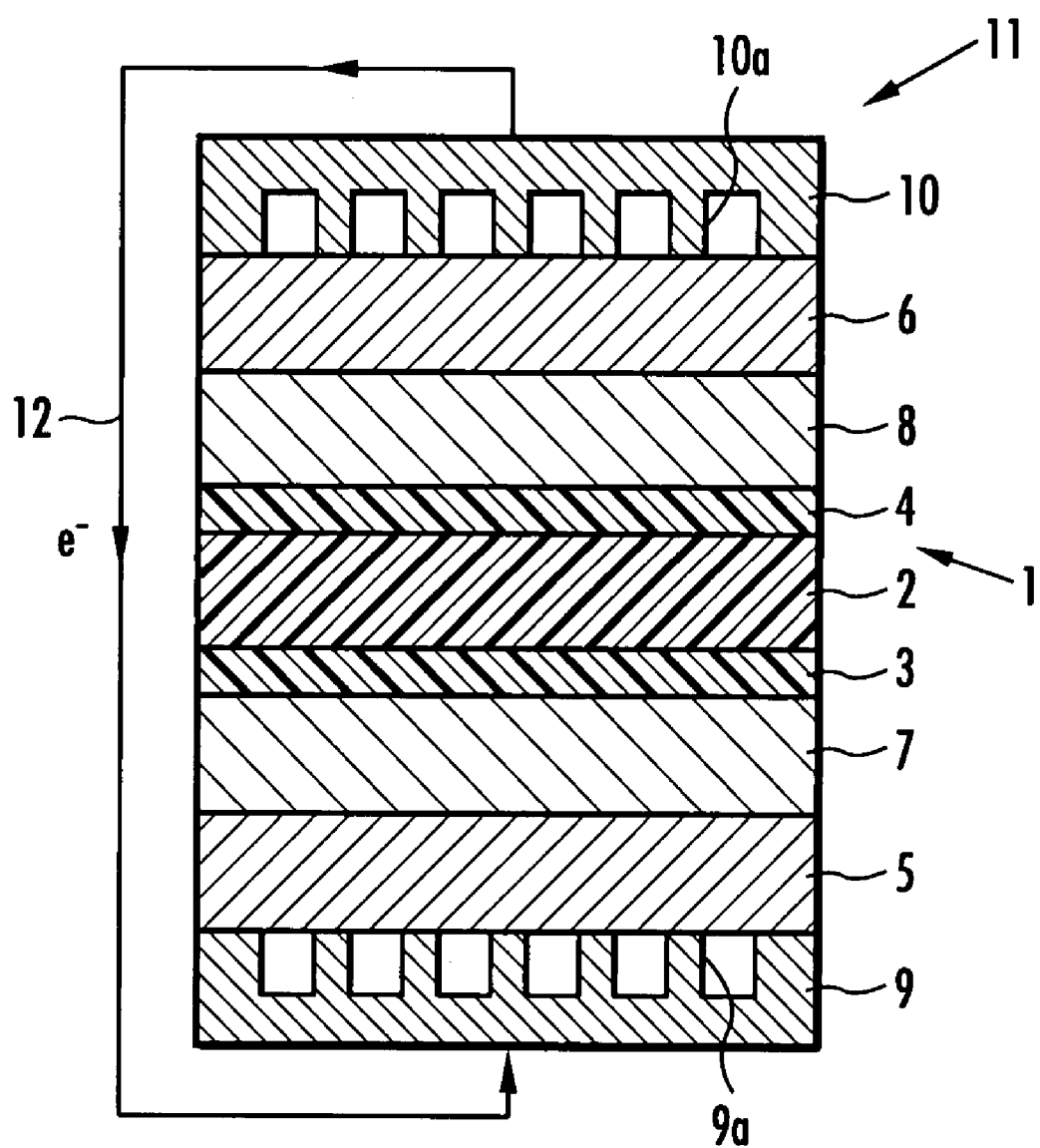
FIG. 2 is a schematic sectional view illustrating a configuration of a fuel cell using the membrane electrode assembly shown in FIG. 1.

Further detailed description is made on an embodiment of the present invention with reference to the accompanying drawings. FIG. 1 is a schematic sectional view illustrating a configuration of a membrane electrode assembly of the present embodiment, FIG. 2 is a schematic sectional view illustrating a configuration of a fuel cell using the membrane electrode assembly shown in FIG. 1, and FIGS. 3 and 4 each show graphs each presenting the relation between the volume of the pores and the terminal voltage in the membrane electrode assembly of the present embodiment.

As shown in FIG. 1, the membrane electrode assembly 1 of the present embodiment comprises: a cathode electrode catalyst layer 3 and an anode electrode catalysts layer 4 respectively disposed on one side and on the other side of a solid polymer electrolyte membrane 2 having proton conductivity; and two gas diffusion layers 5 and 6 disposed respectively on the sides of the electrode catalyst layers 3 and 4, both these sides facing away from the solid polymer electrolyte membrane 2. The membrane electrode assembly 1 of the present embodiment further comprises intermediate layers 7 and 8 disposed respectively between the electrode catalyst layer 3 and the gas diffusion layer 5 and between the electrode catalyst layer 4 and the gas diffusion layer 6.

For the solid polymer electrolyte membrane 2, a film formed of a polymer belonging to the cation exchange resin and having proton conductivity can be used. Examples of the cation exchange resin may include: sulfonated vinyl polymers such as polystyrene sulfonic acid; polymers obtained by introducing sulfonic acid groups or phosphoric acid groups into heat resistant polymers such as perfluoroalkylsulfonic acid polymers and perfluoroalkylcarboxylic acid polymers, polybenzimidazole and polyether ether ketone; and polymers obtained by introducing sulfonic acid groups into the polymers comprising, as the main component, rigid-rod polyphenylene obtained by polymerizing aromatic compounds so as to include a phenylene chain.

The electrode catalyst layers 3 and 4 are each formed by integrating into a single piece a catalyst such as platinum supported on a catalyst carrier such as carbon black with an ion conducting polymer binder. Such electrode catalyst layers 3 and 4 can be formed by applying onto a film made of polytetrafluoroethylene or the like, so as for the catalyst amount to be a predetermined value, a paste which is obtained by mixing a catalyst such as platinum supported on a catalyst carrier such as carbon black with a solution of a resin of the same type as the solid polymer electrolyte membrane 2, and by thereafter transferring the coated paste to both sides of the solid polymer electrolyte membrane 2.

For the gas diffusion layers 5 and 6, for example, a carbon paper subjected to a water-repellent treatment can be used. The water-repellent treatment can be carried out, for example, by impregnating the carbon paper with a solution of tetrafluoroethylene-tetrafluoropropylene copolymer and by thereafter heat treating the carbon paper.

The intermediate layers 7 and 8 comprise pores. In the intermediate layer 7 in the cathode side, the volume per unit area and per unit mass (hereinafter abbreviated as pore volume) of the pores falling within a pore size range from 0.1 to 10 μm falls within a range from 1.7 to 4.3 $\mu l/cm^2/mg$; in the intermediate layer 8 in the anode side, the pore volume of the pores falling within a pore size range from 0.1 to 10 μm falls within a range from 0.5 to 1.4 $\mu l/cm^2/mg$. Such intermediate layers 7 and 8 are formed by applying respectively onto the gas diffusion layers 5 and 6 a paste obtained by mixing an electrically conducting agent having pore formability, such as a carbon powder having both electron conductivity and pore formability with a water-repellent resin such as polytetrafluoroethylene and an organic solvent such as ethylene glycol, and by thereafter heat treating the coated paste. The intermediate layers 7 and 8 may partially penetrate respectively into the gas diffusion layers 5 and 6.

The pore volumes of the intermediate layers 7 and 8 can be derived as follows: for each of the intermediate layers 7 and 8 formed as described above, the volume of the pores falling within a pore size range from 0.1 to 10 μm is measured, for example, by using a mercury porosimeter on the basis of the bubble point method specified in JIS K 3832, and the thus measured volume of the pores is divided by the coated area and the coating amount (mass) of the concerned intermediate layer to give the pore volume thereof. In the present embodiment, the thickness of each of the intermediate layers 7 and 8 can be hardly measured; however, when the densities of the intermediate layers 7 and 8 are the same, the coating amounts (masses) are proportional to the thickness values of the intermediate layers 7 and 8, and hence the coated areas and the coating amounts (masses) are used to obtain the void fraction.

The membrane electrode assembly 1 can be formed as follows: as described above, the electrode catalyst layers 3 and 4 are formed by transferring respectively on both sides of the solid polymer electrolyte membrane 2, thereafter the gas diffusion layer 5 with the intermediate layer 7 formed thereon and the diffusion layer 6 with the intermediate layer 8 formed thereon are laminated respectively on the electrode catalyst layers 3 and 4 so as for the intermediate layers 7 and 8 to respectively face the electrode catalyst layers 3 and 4, and the laminate thus obtained is hot pressed to be bonded into one piece.

As shown in FIG. 2, the membrane electrode assembly 1 can constitute a fuel cell 11 through further lamination of the separators 9 and 10 respectively on the gas diffusion layers 5 and 6. As the separators 9 and 10, for example, carbon materials or metal materials respectively having grooves 9a and 10a can be used, and the separators 9 and 10 are laminated respectively on the gas diffusion layers 5 and 6 so as for the separator sides having the grooves 9a and 10a to face the gas diffusion layers 5 and 6, respectively.

In the fuel cell 11 shown in FIG. 2, hydrogen as the reductive gas is introduced by using the grooves 10a of the separator 10 in the anode side as the flow channels, and air as the oxidative gas is introduced by using the grooves 9a of the separator 9 in the cathode side as the flow channels. In this way, first, in the anode side, the reductive gas introduced from the flow channels 10a is supplied to the anode electrode catalyst layer 4 through the intermediary of the gas diffusion layer 6 and the intermediate layer 8. In the anode electrode catalyst layer 4, protons and electrons are generated from the reductive gas by the action of the catalyst, and the protons migrate to the cathode electrode catalyst layer 3 through the solid polymer electrolyte membrane 2.

Next, in the cathode side, the oxidative gas introduced from the flow channels 9a is supplied to the cathode electrode catalyst layer 3 through the intermediary of the gas diffusion layer 5 and the intermediate layer 7. In the cathode electrode catalyst layer 3, the protons react with the oxidative gas and the electrons to generate water by the action of the catalyst. Consequently, connection of the separators 9 and 10 with a conductive wire makes it possible to form a circuit 12 to transport the electrons generated in the anode side to the cathode side and to take out electric current.

In this connection, when the moisture generated in the cathode electrode catalyst layer 3 is not sufficiently discharged in a long time operation of the fuel cell 11, the moisture becomes excessive to inhibit sufficient diffusion of the reductive gas or the oxidative gas. On the contrary, when the generated moisture is discharged to an excessive extent, the moisture in the solid polymer electrolyte membrane 2 becomes too low. Accordingly, either of these cases involves a fear such that no sufficient electric power generation performance can be attained.

However, in the membrane electrode assembly 1, the pore volume of the pores, in the intermediate layer 7 in the cathode side, falling within a pore size range from 0.1 to 10 μm falls within a range from 1.7 to 4.3 $\mu l/cm^2/mg$, and the pore volume of the pores, in the intermediate layer 8 in the anode side, falling within a pore size range from 0.1 to 10 μm falls within a range from 0.5 to 1.4 $\mu l/cm^2/mg$. The pore volume of the intermediate layer 7 in the cathode side is larger than that of the intermediate layer 8 in the anode side.

Consequently, in the intermediate layer 7 in the cathode side, the diffusion of air as the oxidative gas and the discharge of the generated water can be favorably carried out. On the other hand, in the intermediate layer 8 in the anode side, the moisture needed by the solid polymer electrolyte membrane 2 can be sufficiently retained.

Thus, the membrane electrode assembly 1 can attain an excellent electric power generation performance in a gas atmosphere under a wide variety of humidity conditions ranging from high humidity to low humidity.

Next, the following examples and comparative example of the present invention will be described.

Example 1

In the present example, at the beginning, the gas diffusion layers 5 and 6 were formed by impregnating a sheet of carbon paper with a 10% by weight solution of tetrafluoroethylene-tetrafluoropropylene copolymer and by thereafter heat treating the impregnated carbon paper at 380° C. for 30 minutes for water-repellent treatment.

Next, a mixed paste for the cathode intermediate layer was prepared by mixing, under stirring with a three-dimensional stirrer at 1300 rpm for 10 minutes, 10 g of a vapor grown carbon (trademark: VGCF, manufactured by Showa Denko Co., Ltd.) as an electrically conducting agent having pore formability, 10 g of a polytetrafluoroethylene powder (trade name: Fluon L170J, manufactured by Asahi Glass Co., Ltd.) as a water-repellent resin and 220 g of ethylene glycol as a solvent. Then, the mixed paste for the cathode intermediate layer was applied onto the gas diffusion layer 5 in the cathode side by means of screen printing, and thereafter heat treated at 380° C. for 30 minutes to form the intermediate layer 7 in the cathode side.

Next, a mixed paste for the anode intermediate layer was prepared in the same manner as for the mixed paste for the cathode intermediate layer except that a carbon powder (trade name: Vulcan XC-72, manufactured by Cabot Corp.) was used as the electrically conducting agent having pore formability in place of the vapor-grown carbon and the amount of ethylene glycol as the solvent was set at 180 g. Then, the intermediate layer 8 was formed on the gas diffusion layer 6 in the anode side in the same manner as in the case of the intermediate layer 7 except that the mixed paste for the anode intermediate layer was applied by means of screen printing.

The intermediate layers 7 and 8 were formed so as to partially penetrate into the gas diffusion layers 5 and 6, respectively, and each comprise pores falling within the pore size range from 0.1 to 10 μm.

In the preparation of the gas diffusion layers 5 and 6 respectively comprising the intermediate layers 7 and 8, the carbon paper was beforehand weighed before the application of the mixed paste for the cathode intermediate layer or the mixed paste for the anode intermediate layer. Then, as described above, the carbon paper was coated with the mixed paste for the cathode intermediate layer or the mixed paste for the anode intermediate layer, subjected to the heat treatment, cooled down to room temperature, and then weighed again; then, from the thus obtained weight difference between before and after the formation of each of the intermediate layers 7 and 8 and the coated area on the intermediate layer concerned, the coating amount (mass) per unit area of each of the intermediate layers 7 and 8 was derived.

Next, the volume of the pores falling within a pore size range from 0.1 to 10 μm was measured, by using a mercury porosimeter on the basis of the bubble point method specified in JIS K 3832, and on the basis of the surface tension of mercury set to be 485.0 dynes/cm and the density of mercury set at 13.5335 g/ml. Then, the pore volume of each of the intermediate layers 7 and 8 was derived by dividing the thus measured volume of the pores by the coated area and the coating amount (mass) of the concerned intermediate layer.

The coating amounts (masses) per unit area and the pore volumes of the intermediate layers 7 and 8 are shown in Table 1.

Next, a mixed catalyst paste was prepared by mixing, under stirring with a ball mill 50 g of a platinum-supporting carbon particle (manufactured by Tanaka Kikinzoku Kogyo Co., Ltd.) and an ion conducting polymer (trade name: Nafion (trademark) DE 2020, manufactured by Du Pont Corp.) weighed out so as to give a solid content of 80 g. Then, the mixed catalyst paste was applied onto a sheet made of polytetrafluoroethylene so as for the platinum content to be 0.5 mg/cm$^2$ by means of screen printing and thereafter heat treated at 120° C. for 60 minutes to form a sheet comprising an electrode catalyst layer (hereinafter, abbreviated as an electrode catalyst sheet); in this way, such two sheets were prepared.

Next, the two electrode catalyst sheets were hot press-bonded respectively to both sides of a solid polymer electrolyte membrane (trade name: Nafion (trademark) 112, manufactured by Du Pont Corp.), with the electrode catalyst layer sides to face the solid polymer electrolyte membrane, at 150° C. at a contact pressure of 3.5 MPa for 10 minutes to prepare a laminate, and then the polytetrafluoroethylene sheets were peeled off from the laminate; thus, the electrode catalyst layers were transferred by means of the decor method onto the solid polymer electrolyte membrane 2 in such a way that the cathode electrode catalyst layer 3 was formed on one side of the solid polymer electrolyte membrane 2 and the anode electrode catalyst layer 4 was formed on the other side of the solid polymer electrolyte membrane 2.

Next, on the solid polymer electrolyte membrane 2 with the electrode catalyst layers 3 and 4 formed thereon, the gas diffusion layer 5 with the intermediate layer 7 formed thereon and the gas diffusion layer 6 with the intermediate layer 8 formed thereon were laminated in such a way that the intermediate layer 7 was bonded to the electrode catalyst layer 3 and the intermediate layer 8 was bonded to the electrode catalyst layer 4 to form a laminate; the laminate thus obtained was hot press-bonded at 140° C. at a contact pressure of 2.8 MPa for 10 minutes to fabricate a membrane electrode assembly 1 shown in FIG. 1.

Next, the separators 9 and 10 were laminated respectively on the gas diffusion layers 5 and 6 of the membrane electrode assembly 1, to form a fuel cell 11 shown in FIG. 2; then, hydrogen and air were made to flow through the flow channels 10a in the anode side and the flow channels 9a in the cathode side, respectively. The electric power generation performance under high humidity was evaluated by measuring the terminal voltage at a current of 1 A/cm$^2$ under the conditions that the area of the electrode portions of the membrane electrode assembly 1 was 36 cm$^2$, the cell temperature at the gas introduction devices was 72° C., and the relative humidities of the gas introduction devices were 100% RH both in the anode and cathode sides. Additionally, the electric power generation performance under low humidity was evaluated by measuring the terminal voltage at a current of 1 A/cm$^2$ under the conditions that the area of the electrode portions of the membrane electrode assembly 1 was 36 cm$^2$, the cell temperature at the gas introduction devices was 72° C., and the relative humidities of the gas introduction devices were 29% RH both in the anode and cathode sides. The results thus obtained are shown in Table 2, and FIGS. 3 and 4.

It is to be noted that FIGS. 3(a) and 4(a) refer to the terminal voltages under high humidity and FIGS. 3(b) and 4(b) refer to the terminal voltages under low humidity.

Example 2

In the present example, a membrane electrode assembly 1 shown in FIG. 1 was fabricated in the same manner as in Example 1 except that a mixture prepared by mixing 7.0 g of a vapor-grown carbon (trademark: VGCF, manufactured by Showa Denko Co., Ltd.) and 3.0 g of a carbon powder (trade name: Vulcan XC-72, manufactured by Cabot Corp.) was used as an electrically conducting agent having pore formability in place of the electrically conducting agent having pore formability used to prepare the mixed paste for the cathode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 3.

Example 3

In the present example, a membrane electrode assembly 1 shown in FIG. 1 was fabricated in the same manner as in Example 1 except that a mixture prepared by mixing 10.0 g of a vapor-grown carbon (trademark: VGCF, manufactured by Showa Denko Co., Ltd.) and 1.0 g of a polymethylmethacrylate bead of 5 μm in particle size (trade name: Techpolymer MBX-5, manufactured by Sekisui Plastics Co., Ltd.) as a pore-forming agent was used as an electrically conducting agent having pore formability in place of the electrically conducting agent having pore formability used to prepare the mixed paste for the cathode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 3.

Example 4

In the present example, a membrane electrode assembly 1 shown in FIG. 1 was fabricated in the same manner as in Example 1 except that a mixture prepared by mixing 1.0 g of a vapor-grown carbon (trademark: VGCF, manufactured by Showa Denko Co., Ltd.) and 9.0 g of a carbon powder (trade name: Vulcan XC-72, manufactured by Cabot Corp.) was used as an electrically conducting agent having pore formability in place of the electrically conducting agent having pore formability used to prepare the mixed paste for the cathode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 3.

Example 5

In the present example, a membrane electrode assembly 1 shown in FIG. 1 was fabricated in the same manner as in Example 1 except that a mixture prepared by mixing 10.0 g of a vapor-grown carbon (trademark: VGCF, manufactured by Showa Denko Co., Ltd.) and 5.0 g of a polymethylmethacrylate bead of 5 μm in particle size (trade name: Techpolymer MBX-5, manufactured by Sekisui Plastics Co., Ltd.) as a pore-forming agent was used as an electrically conducting agent having pore formability in place of the electrically conducting agent having pore formability used to prepare the mixed paste for the cathode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 3.

Example 6

In the present example, a membrane electrode assembly 1 shown in FIG. 1 was fabricated in the same manner as in Example 1 except that the mixed paste for the anode was prepared with a ball mill, to replace the three-dimensional stirrer used in Example 1, by stirring and mixing at 120 rpm for 30 minutes.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 4.

Example 7

In the present example, a membrane electrode assembly 1 shown in FIG. 1 was fabricated in the same manner as in Example 1 except that a mixture prepared by mixing 1.0 g of a vapor-grown carbon (trademark: VGCF, manufactured by Showa Denko Co., Ltd.) and 9.0 g of a carbon powder (trade name: Vulcan XC-72, manufactured by Cabot Corp.) was used as an electrically conducting agent having pore formability in place of the electrically conducting agent having pore formability used to prepare the mixed paste for the anode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 4.

Example 8

In the present example, a membrane electrode assembly 1 shown in FIG. 1 was fabricated in the same manner as in Example 1 except that the mixed paste for the anode was prepared with a ball mill, to replace the three-dimensional stirrer used in Example 1, by stirring and mixing at 180 rpm for 150 minutes.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 4.

Example 9

In the present example, a membrane electrode assembly 1 shown in FIG. 1 was fabricated in the same manner as in Example 1 except that a mixture prepared by mixing 5.0 g of a vapor-grown carbon (trademark: VGCF, manufactured by Showa Denko Co., Ltd.) and 5.0 g of a carbon powder (trade name: Vulcan XC-72, manufactured by Cabot Corp.) was used as an electrically conducting agent having pore formability in place of the electrically conducting agent having pore formability used to prepare the mixed paste for the anode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2 and FIG. 4.

Comparative Example 1

In the present comparative example, a membrane electrode assembly 1 shown in FIG. 1 was fabricated in the same manner as in Example 1 except that 10.0 g of a carbon powder (trade name: Vulcan XC-72, manufactured by Cabot Corp.) was used as an electrically conducting agent having pore formability in place of the electrically conducting agent having pore formability used to prepare the mixed paste for the cathode in Example 1, and 10.0 g of a vapor-grown carbon (trademark: VGCF, manufactured by Showa Denko Co., Ltd.) was used as an electrically conducting agent having pore formability in place of the electrically conducting agent having pore formability used to prepare the mixed paste for the anode in Example 1.

The coating amounts (masses) per unit area and the pore volumes of the intermediate layers 7 and 8 were measured in the same manner as in Example 1. The results thus obtained are shown in Table 1.

The electric power generation performances under high humidity and low humidity of the membrane electrode assembly 1 were evaluated in the same manner as in Example 1. The results thus obtained are shown in Table 2.

TABLE 1

| | Cathode side | | Anode side | |
| --- | --- | --- | --- | --- |
| | Coating amount ($mg/cm^2$) | Pore volume ($\mu l/cm^2/mg$) | Coating amount ($mg/cm^2$) | Pore volume ($\mu l/cm^2/mg$) |
| Example 1 | 1.52 | 2.9 | 1.83 | 1.1 |
| Example 2 | 1.63 | 2.0 | 1.83 | 1.1 |
| Example 3 | 1.32 | 4.0 | 1.83 | 1.1 |
| Example 4 | 1.78 | 1.3 | 1.83 | 1.1 |
| Example 5 | 1.08 | 4.7 | 1.83 | 1.1 |
| Example 6 | 1.52 | 2.9 | 1.88 | 0.7 |
| Example 7 | 1.52 | 2.9 | 1.78 | 1.3 |
| Example 8 | 1.52 | 2.9 | 1.95 | 0.4 |
| Example 9 | 1.52 | 2.9 | 1.52 | 1.7 |
| Comparative Example 1 | 1.83 | 1.1 | 1.52 | 2.9 |

TABLE 2

| | Pore volume | | Terminal voltages | |
| --- | --- | --- | --- | --- |
| | Cathode side ($\mu l/cm^2/mg$) | Anode side ($\mu l/cm^2/mg$) | Under high humidity (V) | Under low humidity (V) |
| Example 1 | 2.9 | 1.1 | 0.56 | 0.36 |
| Example 2 | 2.0 | 1.1 | 0.54 | 0.38 |
| Example 3 | 4.0 | 1.1 | 0.57 | 0.32 |
| Example 4 | 1.3 | 1.1 | 0.47 | 0.40 |
| Example 5 | 4.7 | 1.1 | 0.56 | 0.22 |
| Example 6 | 2.9 | 0.7 | 0.53 | 0.34 |
| Example 7 | 2.9 | 1.3 | 0.58 | 0.34 |
| Example 8 | 2.9 | 0.4 | 0.44 | 0.29 |
| Example 9 | 2.9 | 1.7 | 0.58 | 0.23 |
| Comparative Example 1 | 1.1 | 2.9 | 0.44 | 0.18 |

As can be clearly seen from Tables 1 and 2, the membrane electrode assembly 1 of any of Examples 1 to 8 in which assembly the pore volume of the intermediate layer 7 in the cathode side is larger than the pore volume of the intermediate layer 8 in the anode side can attain a better electric power generation performance both under high humidity and under low humidity than the membrane electrode assembly 1 of Comparative Example 1 in which assembly the pore volume of the intermediate layer 7 in the cathode side is smaller than the pore volume of the intermediate layer 8 in the anode side.

As can also be clearly seen from Table 2 and FIG. 3, the membrane electrode assembly 1 of any of Examples 1 to 5 in which assembly the pore volume of the intermediate layer 8 in the anode side is fixed at 1.1 $\mu l/cm^2/mg$ can attain a particularly excellent electric power generation performance both under high humidity and under low humidity when the pore volume of the intermediate layer 7 in the cathode side falls within a range from 2.0 to 4.7 $\mu l/cm^2/mg$.

Figure 4:
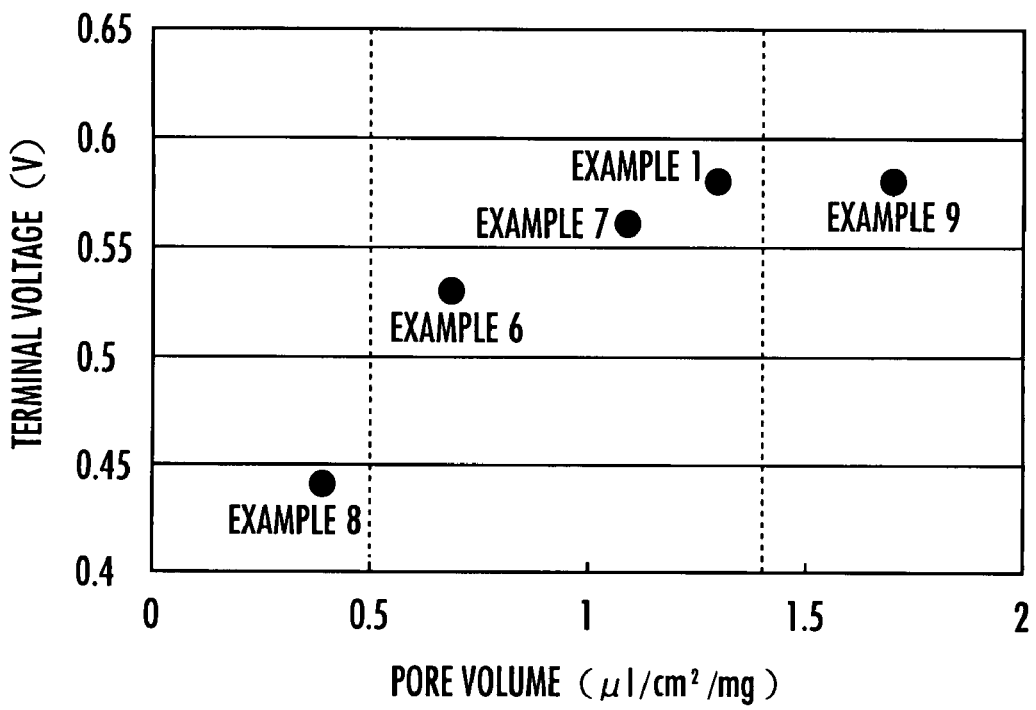
FIG. 4 shows graphs each presenting the relation between the volume of the pores and the terminal voltage in the membrane electrode assembly of the present invention.
Figure 4:
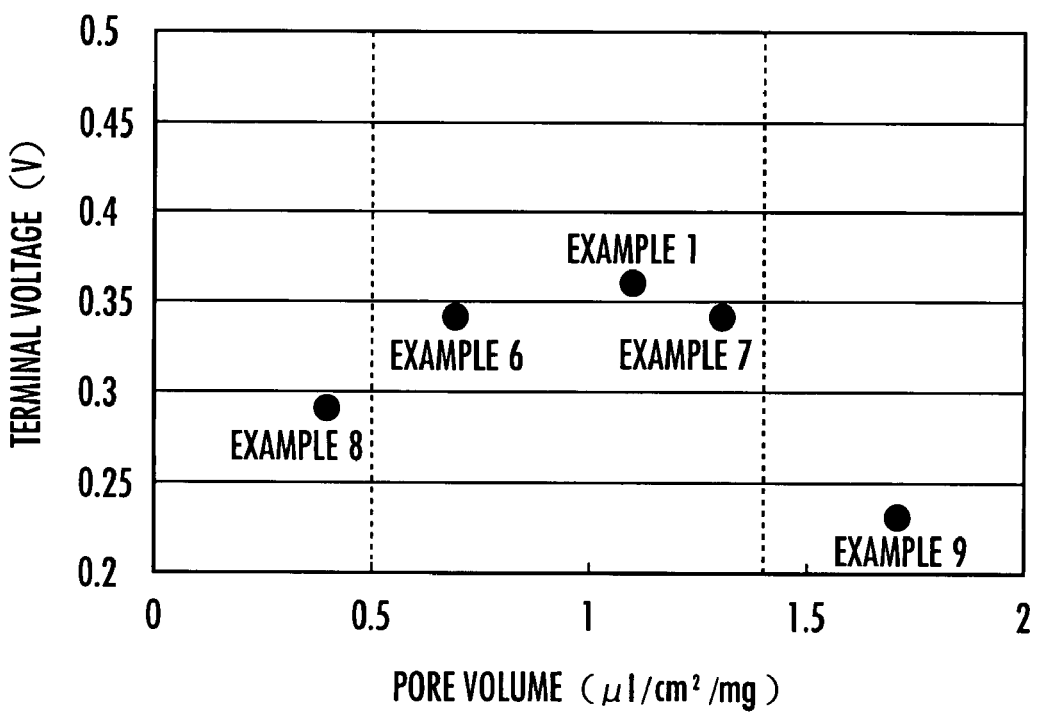

As can also be clearly seen from Table 2 and FIG. 4, the membrane electrode assembly 1 of any of Examples 1 and 6 to 9 in which assembly the pore volume of the intermediate layer 7 in the cathode side is fixed at 2.9 $\mu l/cm^2/mg$ can attain a particularly excellent electric power generation performance both under high humidity and under low humidity when the pore volume of the intermediate layer 8 in the anode side falls within a range from 0.7 to 1.7 $\mu l/cm^2/mg$.

What is claimed is:

1. A membrane electrode assembly for use in a solid polymer electrolyte fuel cell, the membrane electrode assembly comprising:
   a solid polymer electrolyte membrane having proton conductivity;
   a cathode electrode catalyst layer disposed on one side of the solid polymer electrolyte membrane;
   an anode electrode catalyst layer disposed on the other side of the solid polymer electrolyte membrane;
   two gas diffusion layers disposed on a side of the cathode electrode catalyst layer and a side of the anode electrode catalyst layer, respectively, with the sides facing away from the solid polymer electrolyte membrane;
   wherein the membrane electrode assembly comprises two intermediate layers comprising pores and disposed respectively between one of the electrode catalyst layers and the gas diffusion layer pairing therewith and between the other of the electrode catalyst layers and the gas diffusion layer pairing therewith, and the volume per unit area and per unit mass of the pores falling within a pore size range from 0.1 to 10 μm in the intermediate layer in the cathode side is larger than the volume per unit area and per unit mass of the pores falling within a pore size range from 0.1 to 10 μm in the intermediate layer in the anode side; and wherein the volume per unit area and per unit mass of the pores falling within the specified pore size range in the intermediate layer in the cathode side falls within a range from 1.7 to 4.3 μl/cm$^2$/mg, and the volume per unit area and per unit mass of the pores falling within the specified pore size range in the intermediate layer in the anode side falls within a range from 0.5 to 1.4 μl/cm$^2$/mg.

2. The membrane electrode assembly for use in a solid polymer electrolyte fuel cell according to claim 1, wherein each of the intermediate layers is formed of a water-repellent resin comprising an electrically conducting particle.

3. The membrane electrode assembly for use in a solid polymer electrolyte fuel cell according to claim 1, wherein each of the intermediate layers is formed by coating the gas diffusion layer in the same electrode side as the concerned intermediate layer with a paste obtained by mixing an electrically conducting agent having pore formability with the water-repellent resin and an organic solvent and by thereafter heat treating the coated layer.

4. The membrane electrode assembly for use in a solid polymer electrolyte fuel cell according to claim 3, wherein each of the intermediate layers partially penetrates into the gas diffusion layer abutting thereto.

5. The membrane electrode assembly for use in a solid polymer electrolyte fuel cell according to claim 3, wherein the electrically conducting agent having pore formability comprises both or any one of a vapor-grown carbon and a carbon powder having both electron conductivity and pore formability.

6. The membrane electrode assembly for use in a solid polymer electrolyte fuel cell according to claim 3, wherein the electrically conducting agent having pore formability is a mixture comprising a vapor-grown carbon and a polymethylmethacrylate bead.

7. The membrane electrode assembly for use in a solid polymer electrolyte fuel cell according to claim 3, wherein the water-repellent resin is polytetrafluoroethylene.

8. The membrane electrode assembly for use in a solid polymer electrolyte fuel cell according to claim 3, wherein the organic solvent is ethylene glycol.

* * * * *